US008452767B2

(12) United States Patent
Turner et al.

(10) Patent No.: US 8,452,767 B2
(45) Date of Patent: May 28, 2013

(54) TEXT ANALYSIS DEVICES, ARTICLES OF MANUFACTURE, AND TEXT ANALYSIS METHODS

(75) Inventors: Alan E. Turner, Richland, WA (US); Elizabeth G. Hetzler, Richland, WA (US); Grant C. Nakamura, Richland, WA (US)

(73) Assignee: Battelle Memorial Institute, Richland, WA (US)

(*) Notice: Subject to any disclaimer, the term of this patent is extended or adjusted under 35 U.S.C. 154(b) by 1598 days.

(21) Appl. No.: 11/522,178

(22) Filed: Sep. 15, 2006

(65) Prior Publication Data

US 2008/0069448 A1    Mar. 20, 2008

(51) Int. Cl.
*G06F 7/00* (2006.01)
*G06F 17/30* (2006.01)

(52) U.S. Cl.
USPC .................................. 707/736; 704/4; 704/9

(58) Field of Classification Search
USPC .......................................... 707/736; 704/9, 4
See application file for complete search history.

(56) References Cited

U.S. PATENT DOCUMENTS

| | | | |
|---|---|---|---|
| 6,298,174 B1 * | 10/2001 | Lantrip et al. | 382/305 |
| 6,466,211 B1 * | 10/2002 | Havre et al. | 345/440 |
| 6,484,168 B1 * | 11/2002 | Pennock et al. | 1/1 |
| 6,574,632 B2 * | 6/2003 | Fox et al. | 1/1 |
| 6,584,220 B2 * | 6/2003 | Lantrip et al. | 382/154 |
| 6,665,661 B1 * | 12/2003 | Crow et al. | 1/1 |
| 6,772,170 B2 | 8/2004 | Pennock et al. | |
| 6,897,866 B1 * | 5/2005 | Hetzler et al. | 345/440 |
| 6,898,530 B1 | 5/2005 | Saffer et al. | |
| 6,990,238 B1 | 1/2006 | Saffer et al. | |
| 7,113,958 B1 | 9/2006 | Lantrip et al. | |
| 7,185,065 B1 | 2/2007 | Holtzman et al. | |
| 7,283,992 B2 | 10/2007 | Liu et al. | |
| 7,444,356 B2 * | 10/2008 | Calistri-Yeh et al. | 1/1 |
| 7,503,007 B2 | 3/2009 | Goodman et al. | |
| 7,570,816 B2 * | 8/2009 | Bargeron et al. | 382/224 |
| 7,752,204 B2 * | 7/2010 | Kao et al. | 707/736 |
| 7,809,722 B2 * | 10/2010 | Gokturk et al. | 707/736 |
| 2002/0031254 A1 | 3/2002 | Lantrip et al. | |
| 2002/0091678 A1 * | 7/2002 | Miller et al. | 707/3 |
| 2002/0099744 A1 | 7/2002 | Coden et al. | |
| 2002/0159641 A1 * | 10/2002 | Whitney et al. | 382/219 |
| 2002/0194223 A1 | 12/2002 | Meyers et al. | |
| 2003/0028504 A1 * | 2/2003 | Burgoon et al. | 707/1 |

(Continued)

OTHER PUBLICATIONS

WordNet 2.0; http://wordnet.princeton.edu/; May 2004; 1 p.

(Continued)

*Primary Examiner* — Robert Beausoliel, Jr.
*Assistant Examiner* — Michael Pham
(74) *Attorney, Agent, or Firm* — Wells St. John P.S.

(57) ABSTRACT

Text analysis devices, articles of manufacture, and text analysis methods are described according to some aspects. In one aspect, a text analysis device includes processing circuitry configured to analyze initial text to generate a measurement basis usable in analysis of subsequent text, wherein the measurement basis comprises a plurality of measurement features from the initial text, a plurality of dimension anchors from the initial text and a plurality of associations of the measurement features with the dimension anchors, and wherein the processing circuitry is configured to access a viewpoint indicative of a perspective of interest of a user with respect to the analysis of the subsequent text, and wherein the processing circuitry is configured to use the viewpoint to generate the measurement basis.

32 Claims, 8 Drawing Sheets

U.S. PATENT DOCUMENTS

| | | |
|---|---|---|
| 2004/0059736 A1* | 3/2004 | Willse et al. .................. 707/100 |
| 2004/0064438 A1 | 4/2004 | Kostoff |
| 2004/0199505 A1* | 10/2004 | Calistri-Yeh et al. ............. 707/4 |
| 2004/0199546 A1* | 10/2004 | Calistri-Yeh et al. ...... 707/104.1 |
| 2004/0220925 A1 | 11/2004 | Liu et al. |
| 2004/0243388 A1 | 12/2004 | Corman et al. |
| 2006/0143175 A1* | 6/2006 | Ukrainczyk et al. ............... 707/6 |
| 2006/0172276 A1 | 8/2006 | Higgins et al. |
| 2006/0179051 A1* | 8/2006 | Whitney et al. ................... 707/5 |
| 2006/0218140 A1 | 9/2006 | Whitney et al. |
| 2007/0011183 A1 | 1/2007 | Langseth et al. |
| 2007/0033218 A1 | 2/2007 | Taylor |
| 2007/0083509 A1* | 4/2007 | Wu et al. .......................... 707/6 |
| 2007/0118518 A1* | 5/2007 | Wu et al. .......................... 707/5 |
| 2007/0185864 A1 | 8/2007 | Budzik et al. |
| 2007/0294199 A1 | 12/2007 | Nelken et al. |
| 2008/0071762 A1 | 3/2008 | Turner et al. |
| 2008/0088886 A1 | 4/2008 | Silverbrook et al. |
| 2008/0097833 A1 | 4/2008 | Bharat |
| 2008/0140616 A1 | 6/2008 | Encina et al. |
| 2008/0177691 A1 | 7/2008 | Alperovitch et al. |
| 2009/0192966 A1 | 7/2009 | Horvitz et al. |
| 2009/0248683 A1 | 10/2009 | Krause |

OTHER PUBLICATIONS

U.S. Appl. No. 60/651,849; Whitney et al.; filed Feb. 9, 2005; 42 pps.
U.S. Appl. No. 60/651,841; Whitney et al.; filed Feb. 9, 2005; 70 pps.

\* cited by examiner

TEXT ANALYSIS DEVICES, ARTICLES OF MANUFACTURE, AND TEXT ANALYSIS METHODS

GOVERNMENT RIGHTS STATEMENT

This invention was made with Government support under Contract DE-AC0676RLO1830 awarded by the U.S. Department of Energy. The Government has certain rights in the invention.

TECHNICAL FIELD

This disclosure relates to text analysis devices, articles of manufacture, and text analysis methods.

BACKGROUND

Systems and methods have been used to analyze large amounts of text. Some schemes attempt to locate themes common to the text being analyzed and may thereafter associate respective text documents with appropriate themes. These systems may operate to separate information of interest from information that is less relevant or useful. Text analysis systems and methods are becoming increasingly useful as the volume of information available for analysis continues to increase. Some conventional arrangements suffer from drawbacks of being relatively inflexible to accommodate input of a user when performing analysis.

At least some aspects of the present disclosure provide systems, methods and articles of manufacture which improve user interactivity with respect to text processing. Additional aspects provide increased flexibility with respect to text being analyzed as discussed in further detail below.

BRIEF DESCRIPTION OF THE DRAWINGS

Embodiments of the disclosure are described below with reference to the following accompanying drawings.

FIG. 2C is an illustrative representation of a text analysis method according to one embodiment.

FIG. 3 is an illustrative representation of a text analysis method according to one embodiment.

DETAILED DESCRIPTION

The reader is directed to U.S. Pat. Nos. 6,298,174, 6,484,168, and 6,584,220 the teachings of which are incorporated herein by reference, and the text analysis systems and methods described therein. The reader is also directed to U.S. patent application Ser. No. 11/268,282 filed Nov. 3, 2005, entitled "Methods and Apparatus for Steering the Analyses of Collections of Documents", listing Paul Whitney, Susan L. Havre, and David McGee as inventors; U.S. patent application Ser. No. 11/268,283 filed Nov. 3, 2005, entitled "Methods and Apparatus for Steering the Analyses of Collections of Documents", listing Paul Whitney, Susan L. Havre, and David McGee as inventors; and a U.S. patent application Ser. No. 11,522,177, entitled "Text Analysis Devices, Articles of Manufacture, and Text Analysis Methods", naming Alan E. Turner, Elizabeth G. Hetzler, and Grant C. Nakamura as inventors, assigned to the assignee hereof, filed the same day as the present application, and the teachings of which are incorporated herein by reference.

Some aspects of the disclosure are used for knowledge measurement which may be representing textual content mathematically in one embodiment. As described below according to illustrative embodiments, at least some aspects of the present disclosure enable a user to use a viewpoint to affect analysis of text. For example, the user may steer analysis of the text with respect to a perspective of interest of the user. In one embodiment, the viewpoint may indicate the perspective of interest of the user to influence text analysis to provide results relevant to the perspective of interest. As described further below, additional aspects of the present disclosure describe an exemplary embodiment where a plurality of representations of a text item may be combined or blended, for example, for further analysis. Additional aspects are disclosed as is apparent from the following discussion of exemplary embodiments of the disclosure.

According to an aspect of the disclosure, text analysis device comprises processing circuitry configured to analyze initial text to generate a measurement basis usable in analysis of subsequent text, wherein the measurement basis comprises a plurality of measurement features from the initial text, a plurality of dimension anchors from the initial text and a plurality of associations of the measurement features with the dimension anchors, and wherein the processing circuitry is configured to access a viewpoint indicative of a perspective of interest of a user with respect to the analysis of the subsequent text, and wherein the processing circuitry is configured to use the viewpoint to generate the measurement basis.

According to another aspect of the disclosure, a text analysis device comprises processing circuitry configured to access a plurality of text items to be analyzed and to access a measurement basis comprising a plurality of relationships of text patterns and dimension anchors, and wherein the dimension anchors comprise different topics of text content corresponding to a viewpoint indicative of a perspective of interest of a user, and wherein the processing circuitry is configured to analyze the text items using the measurement basis to associate the text items with respect to one another according to the perspective of interest.

According to still another aspect of the disclosure, an article of manufacture comprises media comprising programming configured to cause processing circuitry to perform processing comprising identifying a plurality of initial features of initial text, analyzing the initial features to identify a plurality of measurement features and a plurality of dimension anchors, using the identified measurement features and dimension anchors, generating a measurement basis configured to be used in analysis of subsequent text, accessing a viewpoint indicative of a perspective of interest with respect to the analysis of the subsequent text, and utilizing the viewpoint to perform at least one of the identification of the initial features, the analysis of the initial features, and the generation of the measurement basis.

According to yet another aspect of the disclosure, a text analysis method comprises accessing initial text, accessing a viewpoint indicative of a perspective of interest of a user with respect to analysis of subsequent text, and steering analysis of the initial text using the viewpoint to provide a measurement basis configured to be used in the analysis of the subsequent text with respect to the perspective of interest, wherein the measurement basis comprises a plurality of associations of a plurality of text patterns with a plurality of dimension anchors in accordance with the perspective of interest of the viewpoint.

According to still yet another aspect of the disclosure, a text analysis method comprises accessing a plurality of text items, accessing a perspective of interest of a user and configured to steer an analysis of the text items, using the perspective of interest, analyzing the text items, and responsive to the analyzing, associating individual ones of the text items with one another in accordance with the perspective of interest.

According to an additional aspect of the disclosure, a text analysis method comprises accessing text comprising a plurality of text items to be analyzed, accessing a viewpoint comprising a plurality of text patterns of interest to a user, identifying a plurality of measurement features which may be present in the text items to be analyzed, wherein the identifying comprises identifying using the text patterns of interest of the user, and using the measurement features, analyzing the text items comprising converting text content of the text items into a plurality of respective mathematical signatures indicative of a plurality of dimension anchors corresponding to the respective text items.

Figure 1:
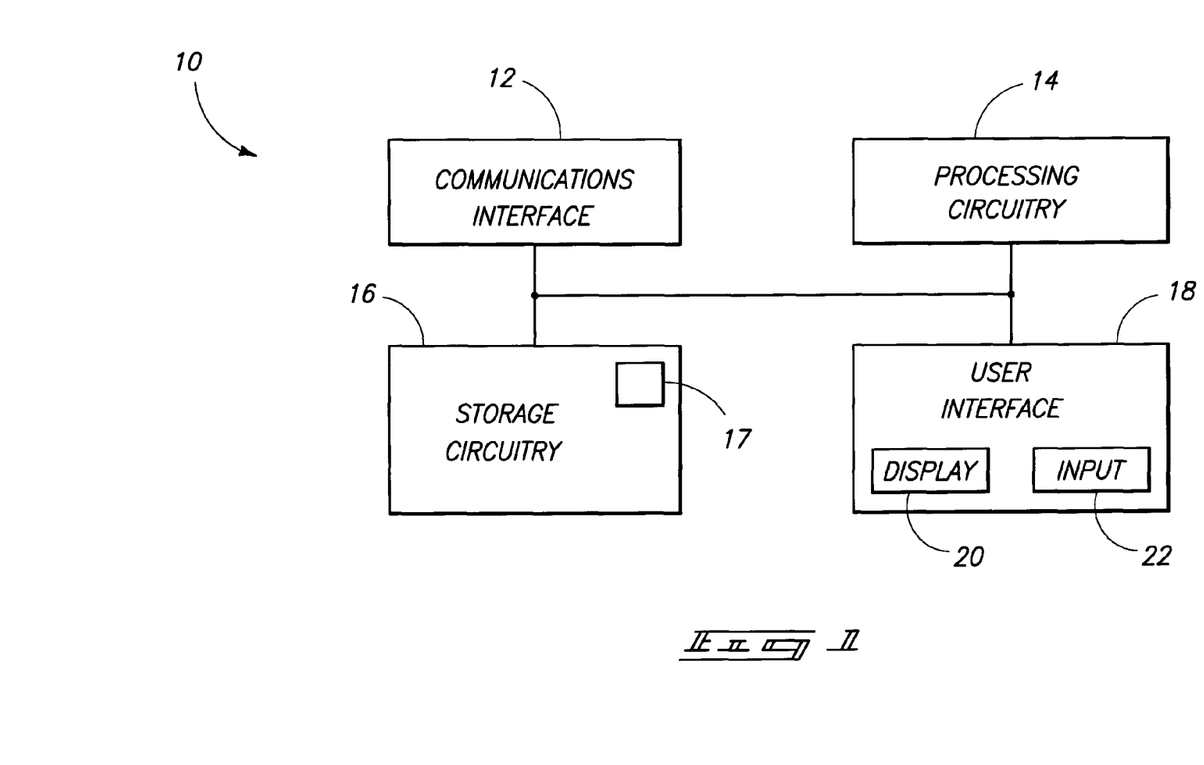
FIG. 1 is a functional block diagram of a text analysis device according to one embodiment.

Referring to FIG. 1, an exemplary text analysis device is illustrated with respect to reference 10. The depicted device 10 includes a communications interface 12, processing circuitry 14, storage circuitry 16 and a user interface 18. Other configurations of text analysis device 10 are possible and may include more, less, and/or alternative components.

Communications interface 12 is arranged to implement communications of text analysis device 10 with respect to external devices not shown. For example, communications interface 12 may be arranged to communicate information bi-directionally with respect to text analysis device 10. Communications interface 12 may be implemented as a network interface card (NIC), serial or parallel connection, USB port, Firewire interface, flash memory interface, floppy disk drive, or any other suitable arrangement for communicating with respect to device 10. Communications interface 12 may communicate with external sources of text to be analyzed in one embodiment.

In one embodiment, processing circuitry 14 is arranged to process data, control data access and storage, issue commands, and control other desired operations. Processing circuitry 14 may comprise circuitry configured to implement desired programming provided by appropriate media in at least one embodiment. For example, the processing circuitry 14 may be implemented as one or more of a processor and/or other structure configured to execute executable instructions including, for example, software and/or firmware instructions, and/or hardware circuitry. Exemplary embodiments of processing circuitry 14 include hardware logic, PGA, FPGA, ASIC, state machines, and/or other structures alone or in combination with a processor. These examples of processing circuitry 14 are for illustration and other configurations are possible.

The storage circuitry 16 is configured to store programming such as executable code or instructions (e.g., software and/or firmware), electronic data, databases, text to be analyzed, or other digital information and may include processor-usable media. Processor-usable media may be embodied in any computer program product(s) or article of manufacture (s) 17 which can contain, store, or maintain programming, data and/or digital information for use by or in connection with an instruction execution system including processing circuitry in the exemplary embodiment. For example, exemplary processor-usable media may include any one of physical media such as electronic, magnetic, optical, electromagnetic, infrared or semiconductor media. Some more specific examples of processor-usable media include, but are not limited to, a portable magnetic computer diskette, such as a floppy diskette, zip disk, hard drive, random access memory, read only memory, flash memory, cache memory, and/or other configurations capable of storing programming, data, or other digital information.

At least some embodiments or aspects described herein may be implemented using programming stored within appropriate storage circuitry 16 described above and/or communicated via a network or other transmission media and configured to control appropriate processing circuitry 14. For example, programming may be provided via appropriate media including, for example, embodied within articles of manufacture 17, embodied within a data signal (e.g., modulated carrier wave, data packets, digital representations, etc.) communicated via an appropriate transmission medium, such as a communication network (e.g., the Internet and/or a private network), wired electrical connection, optical connection and/or electromagnetic energy, for example, via a communications interface, or provided using other appropriate communication structure or medium. Exemplary programming including processor-usable code may be communicated as a data signal embodied in a carrier wave in but one example.

User interface 18 is configured to interact with a user including conveying data to a user (e.g., displaying data for observation by the user, audibly communicating data to a user, etc.) as well as receiving inputs from the user (e.g., tactile input, voice instruction, etc.). Accordingly, in one exemplary embodiment, the user interface may include a display 20 (e.g., cathode ray tube, LCD, etc.) configured to depict visual information and a keyboard, mouse and/or other input device 22. Any other suitable apparatus for interacting with a user may also be utilized.

In one embodiment, text analysis device 10 may analyze text items of a corpus and the text items may individually include sequences of meaning bearing symbols (e.g., letters, emails, documents, speech transcriptions, news reports, etc.). Text analysis device 10 performs the analysis in one embodiment to identify topics and themes using the text of the corpus. Thereafter, text analysis device 10 may attempt to associate individual ones of the text items with the identified topics or themes in one implementation. Additional details of identification of topics and association of the text items with the topics according to one embodiment are discussed in the '174 and '220 patents incorporated by reference above.

Figure 2:
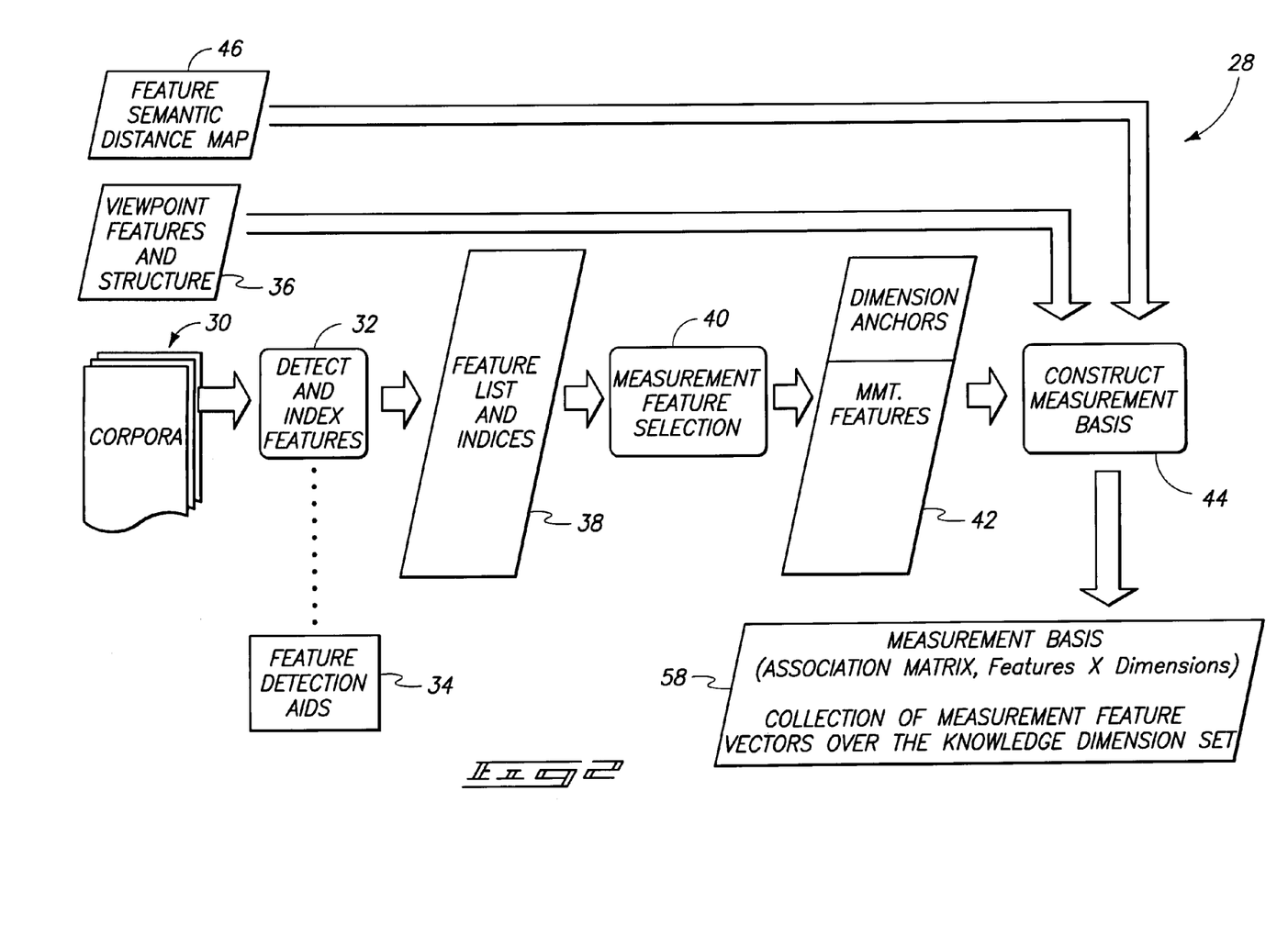
FIG. 2 is an illustrative representation of a text analysis method according to one embodiment.

As described with respect to FIGS. 2-3, exemplary embodiments of text analysis device 10 are disclosed which enable a user to affect (e.g., steer) the analysis of text analysis device 10 in the identification and/or selection of topics. For example, the user may steer the analysis to the perspective of interest of the user. As described with respect to FIG. 4, additional exemplary embodiments of text analysis device 10 may combine or blend a plurality of representations of a text item (e.g., signatures such as mathematical vectors) during analysis of the text item (e.g., analysis to associate the text item with one or more other text item and/or topic). In one example, one of the representations may be referred to as a statistically interesting vector which may be generated in one embodiment by the implementation of the '168 patent, while one or more additional representation may be generated using the disclosed steering aspects and be referred to as steered vectors (or otherwise generated and different from another representation of the text item). In the above example, generation of statistically interesting vectors is described in the '168 patent and such vectors are generally based upon the contents of the text (e.g., vectors comprising important characteristics of the data itself resulting from the analysis the content) while steered vectors are biased towards topics of interest of the analyst.

The discussion proceeds with respect to different types of processing which may be performed by processing circuitry 14. The discussion with respect to FIGS. 2-2C describes an exemplary embodiment for generating a measurement basis which is usable in subsequent analysis of text. FIG. 3 describes an exemplary method of using a measurement basis to process text items and FIG. 4 describes an exemplary method of combining or blending plural representations of a text item as mentioned above.

The processing circuitry 14 may process initial text, for example process text items of a corpora, to generate the measurement basis. Following the generation of the measurement basis, the processing circuitry 14 may utilize the measurement basis to process subsequent text, for example, perform processing including generating plural representations of text items (e.g., converting subsequent text items into the representations). In some embodiments, some, all or none of the initial text may be processed as subsequent text using the generated measurement basis.

The representations may represent the knowledge measurement of the text performed by text analysis device 10. In a more specific example, the representations are mathematical signatures (e.g., vectors) whose content includes the knowledge measurements. The representations may be used to further analyze the text items, including associating text items with one another (e.g., clustering or categorizing the text items as described in the '174 and '220 patents in one embodiment). The associations of the text items (for example into clusters) may be steered in accordance with a perspective of interest of a user (e.g., using a measurement basis to provide steering during generation of representations of the text items which are analyzed to provide the associations) in one embodiment.

As mentioned above, the text used to generate the measurement basis may be referred to as initial text while text of which representations are generated may be referred to as subsequent text. Some, all or none of the subsequent text may be the same as the initial text.

Referring to FIG. 2, an exemplary method 28 of analyzing text according to a viewpoint is shown. In one embodiment, the user may input the viewpoint into text analysis device 10. The viewpoint may be provided in other ways in other embodiments, for example, accessed from a database of viewpoints. An exemplary viewpoint includes a plurality of viewpoint features which are text patterns of interest to the user in one embodiment. For example, the viewpoint may include text patterns in the form of words selected by the user to steer the textual analysis by device 10 into a desired direction (e.g., currency, dollar, weapons, nuclear, guns, etc.). Any suitable text patterns in addition to words (e.g., text patterns in the form of phrases, lemmas, entities, or any meaning bearing sequence of symbols) may be provided in a viewpoint.

Text analysis device 10 may access initial text in the form of corpora 30 which typically includes a plurality of text items. The corpora 30 may be static (e.g., text items of a fixed database or resource) or dynamic (e.g., text items of a continually changing source). In one embodiment, the corpora 30 is accessed via communications interface 12.

Processing circuitry 14 is configured to detect and index features 32 in one embodiment. In one embodiment, processing circuitry 14 is configured to scan text items of corpora 30 for the presence of features, which may be referred to as initial features, to identify the features. As described below, processing circuitry 14 may select a subset of the initial features to be measurement features which may be related to a plurality of dimension anchors as discussed further below (measurement features may also be referred to as filtered words or filtered features in one implementation). Initial features may comprise any lexical sequence, pattern, set of alternatives, words, lemmas, entities, phrases or any recognizable pattern of symbols. In the described arrangement, the initial features are used in knowledge measurement described further below. In one embodiment, lexical scanning may be performed by processing circuitry 14 to detect the initial features. One exemplary embodiment of lexical scanning provides symbol identification at a lexical level. For example, lexical scanning may identify delineated sequences of symbols that constitute the vocabulary of the text under study. Another scanning method may utilize a moving window of text characters (e.g., 4-10 symbols wide) as an n-gram vocabulary feature.

Figure 2A:
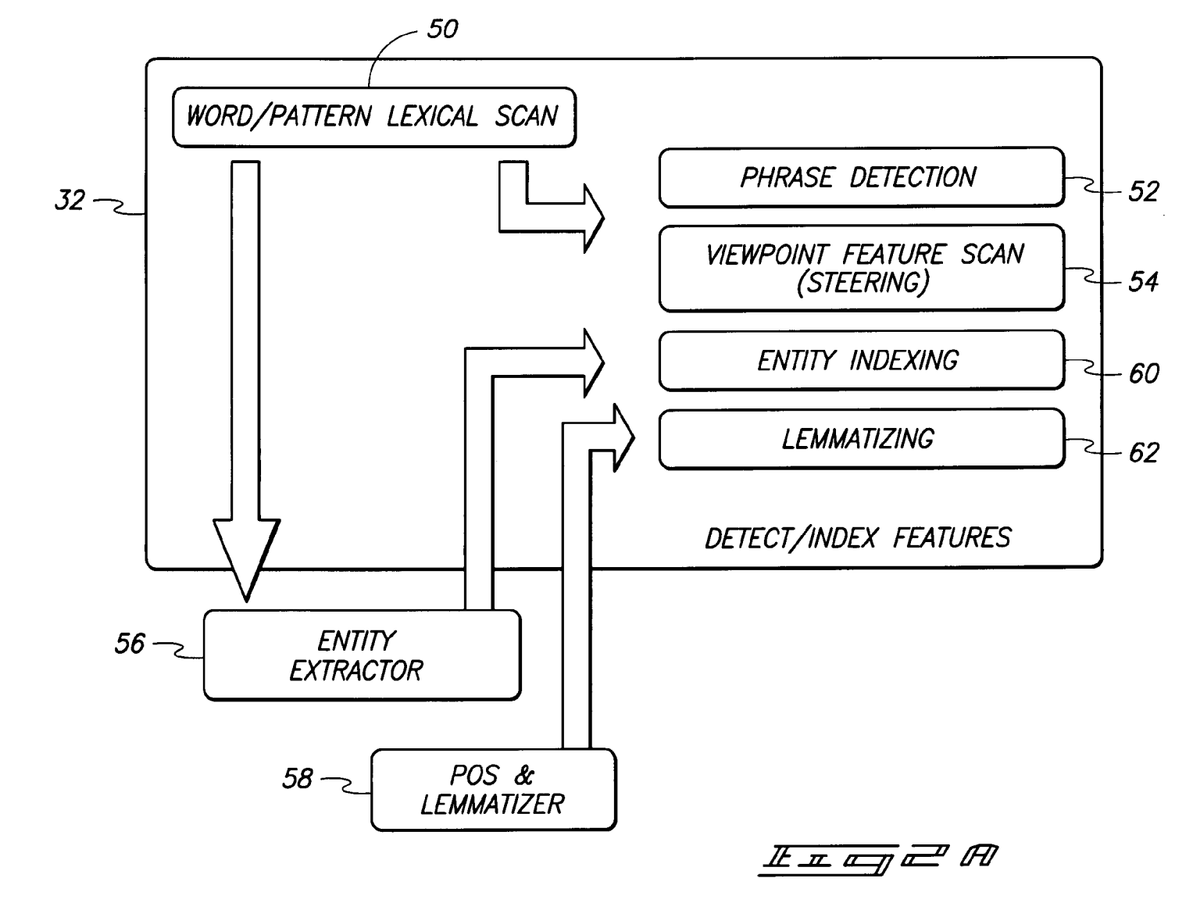
FIG. 2A is an illustrative representation of a text analysis method according to one embodiment.

Referring to FIG. 2A, exemplary additional methods are shown to perform detection and indexing of features 32. For example, phrase detection 52, viewpoint feature scan 54, entity indexing 60 and/or lemmatizing 62 may be used instead of or in addition to lexical scanning. Phrase detection 52 identifies sequences of patterns, such as a pattern of words (e.g., United States * America). Referring to viewpoint feature scan 54, a viewpoint may be accessed by processing circuitry 14 and the viewpoint features (text patterns) of the viewpoint may be used as initial features. The viewpoint features of the viewpoint are identified and indexed as initial features to be processed with respect to possibly becoming measurement features. In one embodiment, the text items are searched for the presence of the text patterns of the viewpoint and the frequency of occurrences of the respective text patterns in the text items are determined and indexed. Entity indexing (e.g., people, places, named things) and lemmatizing (e.g., lemmatized variants of words, such as run=running=ran . . . ) features 60, 62 utilize external feature detectors (e.g., entity extractor 56 and part of speech (POS) lemmatizer 58) to find their respective classes of initial features. The result of detect and index features 32 is a list of the initial features. In addition, information regarding where and how frequently they occur within corpora 30 may also be provided (e.g., identifying the number of occurrences in individual text items of corpora 30). Accordingly, in the described embodiment, the output of detection and indexing of features 32 may be a feature list and indices 38 of FIG. 2.

In embodiments wherein phrases and entities are used as features (FIG. 2A, phrase detection 52 and entity indexing 60), alternative equivalent forms may be considered as a single canonical representation rather than a multitude of independent features in one embodiment. For example, "President Clinton," "President Bill Clinton," and "William Jefferson Clinton" may be examples of the same feature. A similar principal may exist with lemmatizer processing 62 where many vocabulary words are treated as equivalent expressions of the same "lemma" dictionary form in one embodiment.

In one embodiment, terms which appear within entities (e.g., "United" in "United States of America") may be considered as both their own feature as well as a component of another feature in some cases. In one embodiment, the type of entity may be used as the deciding factor, for example, with highly focused entities and classes not having their constituent terms counted as independent features where good canonical reduction is possible.

Figure 2B:
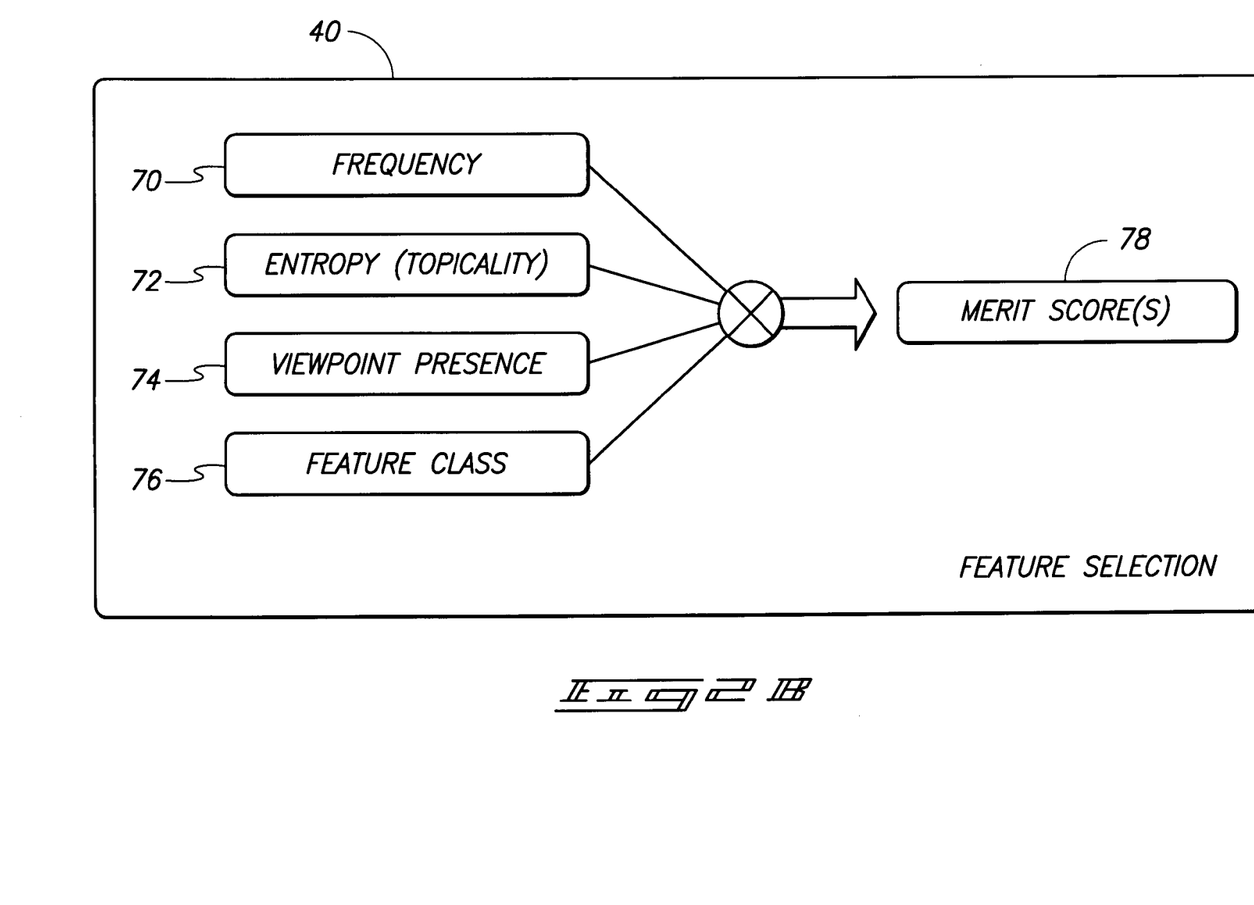
FIG. 2B is an illustrative representation of a text analysis method according to one embodiment.

Referring to FIG. 2B, processing circuitry 14 may perform measurement feature selection processing 40 upon the feature list and indices 38 to select the measurement features from the initial features. Processing circuitry 14 may provide and use merit scores 78 to select the measurement features in one embodiment. In one example, processing circuitry 14 uses the merit scores 78 to filter a potentially large number of initial features into the measurement features which are operated upon during subsequent analysis. In one embodiment, frequency 70 and topicality 72 filters may be used as described in the '168 patent. The frequency filtering 70 may remove initial features which occur less often than other initial features in the corpora 30 or less than a threshold. A generalized form of the topicality filter 72 is an entropy test which assesses how much order a particular feature can account for in a collection of text. An overlap filter described in the '168 patent may also be used in one embodiment and which utilizes second order statistics to compare the remaining initial features to determine the features whose placement in the database are highly correlated with one and another. Additional details of filtering to compress the initial features into the measurement features according to one embodiment are discussed in the '168 patent.

According to one embodiment, processing circuitry 14 may perform additional (or alternative) processing during the measurement feature selection processing 40. According to the exemplary disclosed steering embodiment, processing circuitry 14 may perform viewpoint presence processing 74 where initial features which are viewpoint features occurring in the viewpoint are credited with increased merit (e.g., increasing a merit score of a viewpoint feature) to bias processing circuitry 14 towards selection of such viewpoint features as measurement features.

Processing circuitry 14 may also use feature class processing 76 which provides extra merit for entities or particular parts of speech. One or more of the different selection criteria (e.g., frequency, topicality, viewpoint, class) may be weighted and combined into final merit scores for the features being analyzed in one embodiment. In some embodiments, less than all of the processing 70, 72, 74, 76 or other methods may be used to process the initial features. In one embodiment, 2000 measurement features are selected from the initial features using the respective merit scores and may be referred to as a measurement vocabulary.

In one embodiment, sources of merit and respective weightings may be empirically determined for the domain and type of data of particular interest. In one implementation (e.g., using frequency and entropy of the '168 patent), frequency is a relatively sharp pass/fail response and entropy provides finer distinction of merit. For example, a frequency test may provide merit of either 0.0 or 1.0, and entropy merit may range from 0.0 to 0.1, and their product may be the merit score of the feature.

In another embodiment, viewpoint presence (another relatively sharp filter) may serve to multiply the merit score by a factor of between 2 and 10×. A class of feature may be given a range of values varying between 0.1 for a word of relatively less semantic power (e.g., an article) to 5× for a word of great linguistic significance to meaning (e.g., an entity), and entropy may range between 0.0 to 1.0. A combining function may be a product of these exemplary varying merit inputs in one embodiment. Additionally, a non-linear combining function which emphasizes good merit in multiple dimensions (such as sum of squares function) may be more robust.

In an additional embodiment, feature selection of the very highest merit features may be provided in each respective scheme (e.g., the highest entropy, the strongest viewpoint features, the highest class of features) by reserving part, for example 10%, of the feature selection space for that purpose. The remainder of the feature space may be populated by the best combined merit scores. Other methods are possible in other embodiments.

In one embodiment, further steps of processing 40 may include selection of dimension anchors which may also be referred to as topic words, topic features, or anchoring features which correspond to respective knowledge dimensions which may also be referred to as knowledge features. Dimension anchors are indicative of topical content of text in the described implementation and may be used to measure knowledge. The dimension anchors are selected and a plurality of measurement features are associated with individual ones of the dimension anchors. The knowledge dimensions individually comprise the plurality of associations of the measurement features with a respective one of the dimension anchors.

In one dimension anchor selection embodiment, processing circuitry 14 selects the measurement features having the highest merit scores as the dimension anchors. In the described arrangement, processing circuitry 14 selects 200 of the measurement features having the highest merits scores. The decision on highest merit may use a different merit score than the original one used to identify the measurement vocabulary in one embodiment (e.g., a higher weight may be given for viewpoint and entropy). The output of processing 40 is the measurement features and dimension anchors 42.

In view of the biasing when a viewpoint is used in one steering embodiment, it is possible that at least one of the measurement features and one of the dimension anchors correspond to one of the text patterns of the viewpoint. More specifically, the increase of a merit score of an initial feature corresponding to a text pattern of a viewpoint biases the selection of the initial feature compared to other initial features not occurring in the viewpoint in one embodiment. For example, it is likely in at least one viewpoint embodiment, that many of the measurement features and several of the dimension anchors correspond to text patterns of the viewpoint.

Referring to FIGS. 2 and 2C, processing circuitry 14 proceeds to perform processing 44 of the measurement features and dimension anchors 42 to construct a measurement basis 58. The measurement basis 58 may indicate a plurality of associations or relationships of individual ones of the measurement features with respect to the dimension anchors as described in the '168 patent. In one example, the relationships of measurement basis 58 are provided in the form of an array which may be referred to an association matrix. Rows of the array may be the measurement features and columns of the array may be the dimension anchors. Processing 44 provides an array which may include the relationships in the form of a plurality of association values (e.g., between 0 and 1) which individually express strength of association in meaning between a measurement feature and a dimension anchor. Association values may be used to estimate expressions of knowledge dimensions corresponding to a plurality of measurement features within a subsequent text item. The values collectively are a measurement basis 58 in one embodiment and are capable of encoding the knowledge patterns present in any set of measurement features in terms of the orientating knowledge dimensions.

In one embodiment, association values of measurement basis 58 which make relatively small contributions (e.g., <1/1000th) to both the respective measurement feature and dimension anchor may be reduced to zero. A high proportion of the measurement basis values may fall within this category and the above-exemplary processing allows techniques for sparse matrix mathematics to be employed which may substantially improve performance.

The exemplary method of FIG. 2C may perform processing 80 to provide a plurality of conditional probability values corresponding to conditional probabilities of measurement features and dimension anchors. Additional details of conditional probability values are discussed in the '168 patent. The processing 44 generates association values 88 of the measurement basis 58 from the conditional probability values.

Figure 2D:
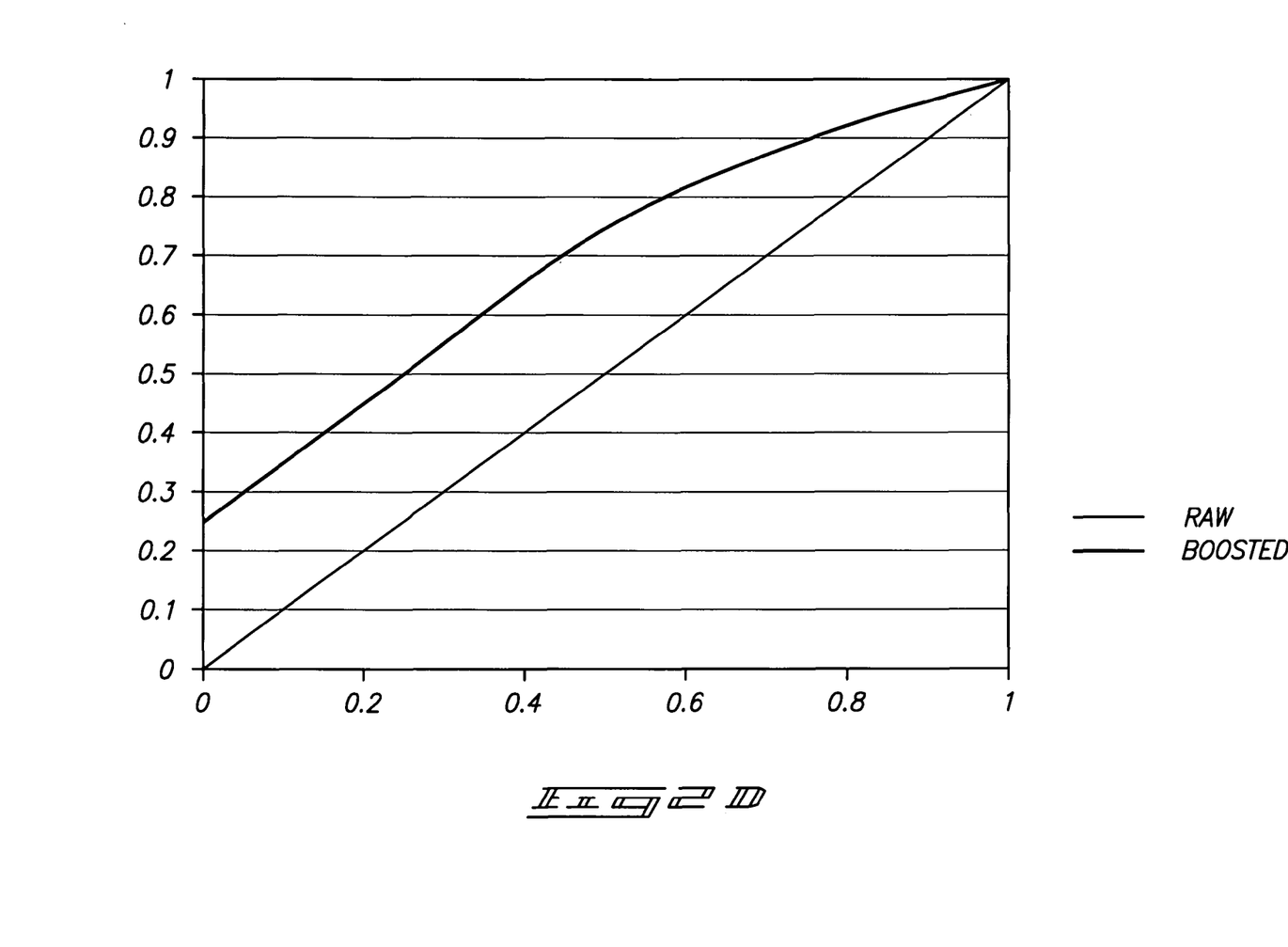
FIG. 2D is a graphical representation of viewpoint boosting of relationships of measurement features and dimension anchors according to one embodiment.

According to embodiments wherein a user desires to steer the analysis, the viewpoint may be used to construct the measurement basis 58 during processing 44. In one embodiment, a conditional probability value may be enhanced by processing 82 when a measurement feature and respective dimension anchor are both in a viewpoint, also referred to as viewpoint co-occurrence. The enhancement may be referred to as an association boost or association hint and may be implemented according to FIG. 2D in one embodiment. The original conditional probability estimate may be increased to account for the respective viewpoint relationship. In the exemplary embodiment of FIG. 2D, a non-linear boost or enhancement may be used and may provide base relationships of 0.25, 0.5 and 1.0 when a conditional probability value is 0, 0.25 and 1.0, respectively. Additional exemplary values are shown in the graph of FIG. 2D in one embodiment. Viewpoint boosting may be implemented according to different values in other embodiments.

According to additional exemplary aspects, relationships may be enhanced or boosted when they have a relatively close semantic distance during processing 84. In one embodiment, the semantic boosting may be non-linear and provide 50% of the effect at a conditional probability value of 0.25. For a zero semantic distance, a base relationship of 0.9 may be provided, and for a semantic distance of 10% of the diameter of the knowledge space, the base relationship may be zero. A feature semantic distance map 46, such as WordNet 2.0 (http://wordnet.princeton.edu/, the teachings of which are incorporated by reference), may be used in one implementation to provide semantic distance information. Different implementations of semantic boosting may be used in other embodiments.

Another possible method of implementing steering is to provide a correction when a measurement feature is part of the viewpoint during processing 86. This exemplary boosting may be implemented in a measurement basis matrix example by multiplying an entire row of the matrix corresponding to the respective measurement feature (i.e., multiplying the conditional probability values for all dimension anchors) by a steering gain. In one example, the steering gain may be in the range of 5× to 10× and smaller steering gains may be used when viewpoint features are heavily represented among the measurement features. In this configuration, some resultant association values may be greater than 1.0. This boosting may be performed during the generation of the measurement basis to avoid weighting during exemplary vector computations described below (i.e., the weighting is precomputed into the measurement basis).

According to one embodiment, a viewpoint may be subdivided into multiple classes of features capturing differing major components of the user's perspective. The feature selection merit system (e.g., processing 74 of FIG. 2B) may seek to represent each of the classes in feature selection in one embodiment. In addition, measurement basis relationship enhancement for co-occurrence (e.g., processing 82 of FIG. 2C) may have one level of boost for viewpoint features across classes and an even higher boost for viewpoint features within a class in one embodiment.

The output of the processing of FIG. 2 is measurement basis 58. As discussed above, measurement basis 58 may thereafter be used to process subsequent text items, including computing representations such as vectors of the text items in one embodiment. A plurality of measurement bases (e.g., corresponding to unsteered and/or perhaps different forms of steering using different viewpoints) may be generated during processing of FIG. 2 and used during processing of subsequent text described below.

In one embodiment, approximately 200 knowledge dimensions are used in vector knowledge representation. If multiple bases are utilized, the total dimensionality increases and computational complexity may become a factor for post-vectorization operations such as cluster analysis, categorization, and/or projection. One embodiment may perform a dimensionality reduction operation on the measurement basis 58 using a mathematical technique such as mutual orthogonalization to identify highly distinctive dimensions and compress together or eliminate those that are fairly parallel or redundant expressions of the same features. In one embodiment, one measurement basis 58 may be equivalently replaced with another simpler one to the extent that it continues to express a large proportion of the knowledge patterns contained in the original.

Referring to FIG. 3, exemplary processing comprising a measurement scheme 90 performed by processing circuitry 14 is shown. The measurement scheme 90 is one embodiment of processing of subsequent text which may also be referred to as text knowledge vectorization. Measurement scheme 90 is described with respect to providing representations comprising vectors of the text items 100 being processed. Text items 100 may or may not be the same as corpora 30 discussed with respect to FIG. 2 and may be subsequent text described above.

Processing circuitry 14 generates a feature vector for a given text item 100 during processing 102. If the text item 100 being analyzed was processed during the generation of the measurement basis 58 during initial text processing, processing circuitry 14 may access an index 104 for the respective text item 100 and which identifies the number of occurrences (frequency) of the measurement features in the text item 100 and generate a measurement feature representation 106 (e.g., vector) which is a list of frequencies of the respective measurement features occurring in the respective text item 100. If text item 100 was not processed during the initial text processing of FIG. 2, processing circuitry 14 can scan the text item 100 for the measurement features to determine the list of frequencies of the respective measurement features to generate the measurement feature representation 106.

During processing 108, processing circuitry 14 may perform vectorization of the measurement feature representation 106 to provide a document raw knowledge vector 112. Processing circuitry 14 may access measurement basis 58 and perform matrix multiplication of the representation 106 comprising a vector in the described embodiment by the measurement basis 58. Processing 108 transforms the measurement feature representation into document raw knowledge vector 112 in the described vectorization embodiment using a highly optimizable linear algebra operation suitable for large scale computation in the described embodiment. The measurement basis 58 is usable to indicate associations of text patterns occurring in the subsequent text item 100 (e.g., corresponding to measurement features) to the dimension anchors in one embodiment.

Processing circuitry 14 may normalize the document raw knowledge representation during processing 114 which provides a representation 116 of the text item 100 which may be used to process the text item in a plurality of different ways of subsequent text analysis including clustering, categorization, and/or visualization, for example, provided in the '174 and '220 patents. In the described embodiment using vectors, processing circuitry 14 may divide the vector by its own length providing normalized vectors of respective text items 100 being analyzed of comparable magnitudes. Responsive to the exemplary steering described above, the text items 100 may be associated with one another, for example into clusters using the exemplary methods of the '174 and '220 patents, and in accordance with the perspective of interest of the user. Processing circuitry 14 may control the display 20 to depict visualizations of the associations in one embodiment.

As mentioned above and with reference to FIG. 4, aspects of the disclosure are directed to combining or blending of different representations of a given text item. A representation 116 of a given text item 100 may be combined or blended with another representation of the text item 100 before desired further text analysis. One illustrative example is blending of a representation of a text item outputted by the processing in accordance with the '168 patent (the representation may be referred to as a statistically interesting vector) with another representation of the text item outputted by the steered processing described above (the representation may be referred to a steered vector). In other embodiments, a plurality of different steered vectors may be combined.

Figure 4:
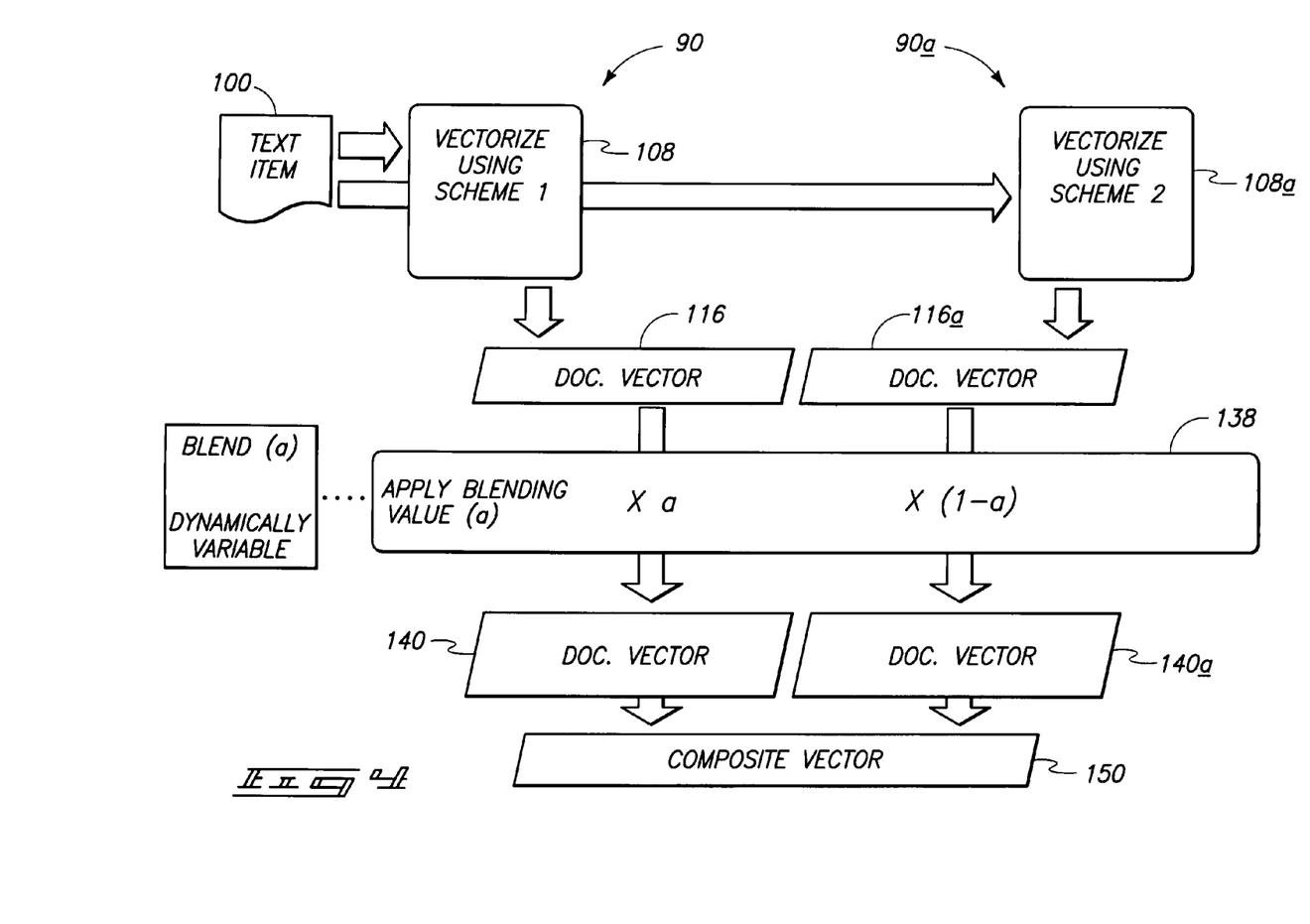
FIG. 4 is an illustrative representation of a text analysis method according to one embodiment.
Figure 5:
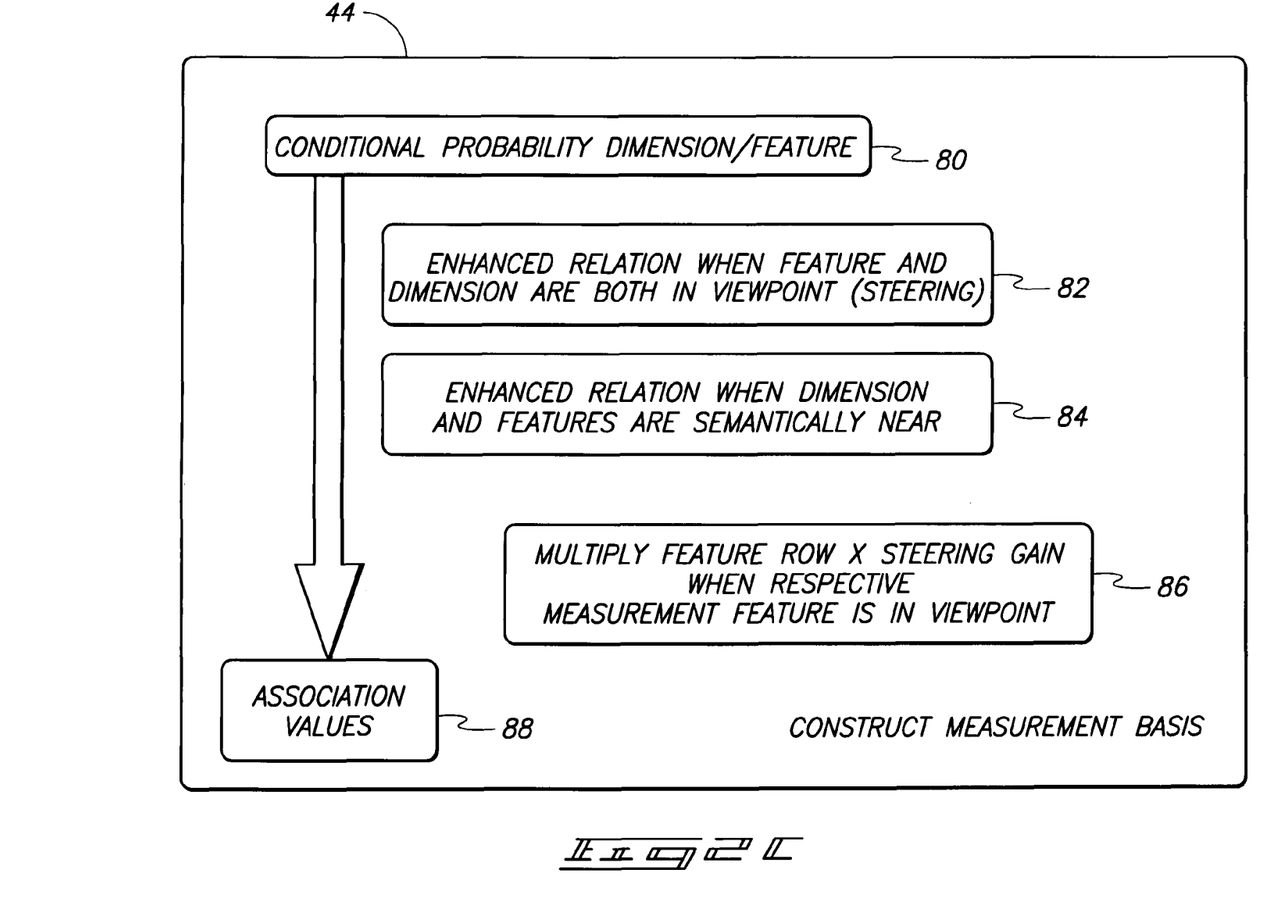
Figure 7:
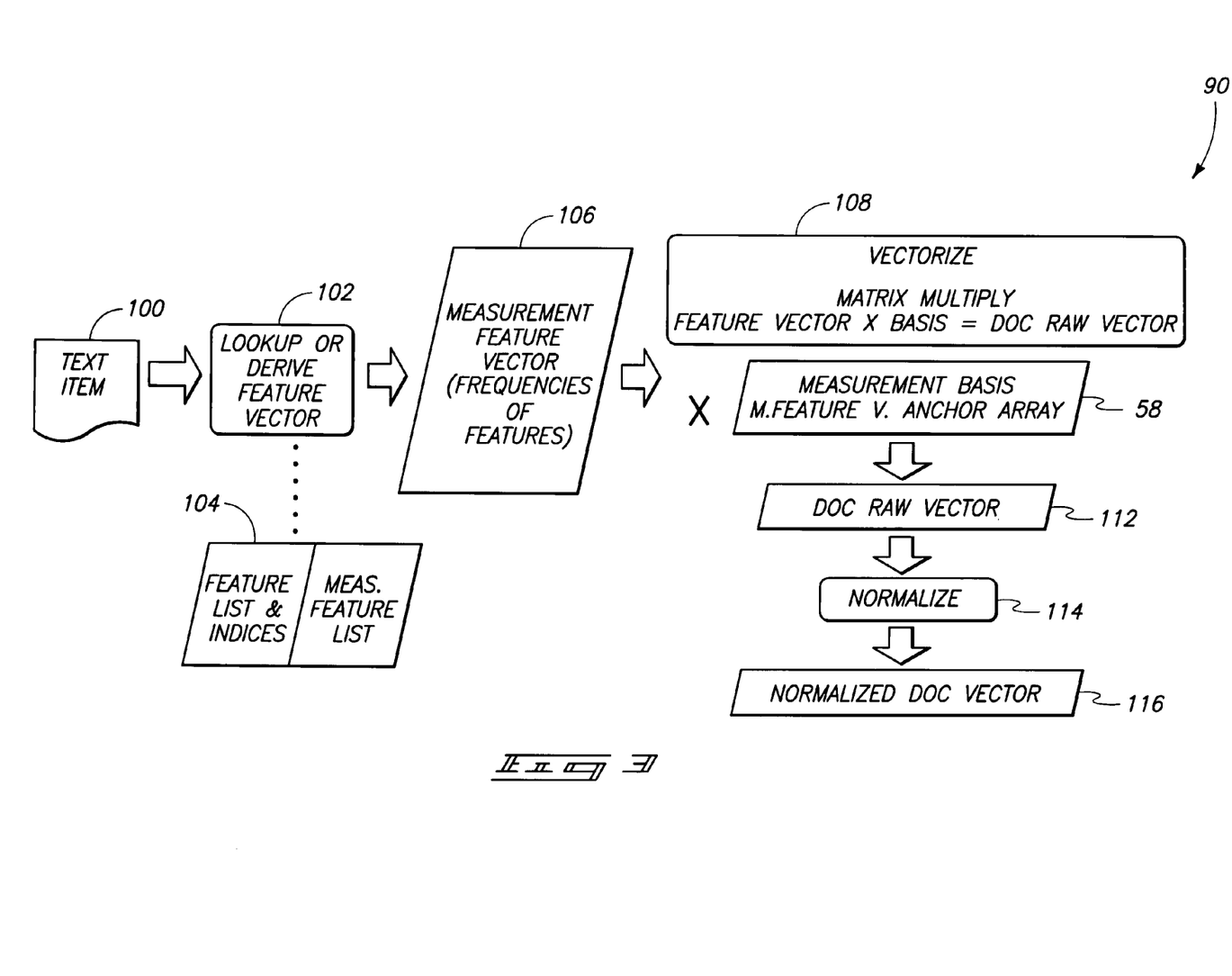

As shown in FIG. 4, a text item 100 may be processed using a plurality of measurement schemes 90, 90a to provide plural representations comprising vectors in the described embodiment and corresponding to respective different vector spaces. Additional measurement schemes 90, 90a may be used in other embodiments. The respective measurement schemes 90, 90a may use plural respective different measurement bases 58 in one embodiment to provide different representations (e.g., document vectors) 116, 116a of the text item 100. One measurement basis may have been constructed to not implement steering (e.g., providing statistically interesting vectors of the '168 patent) while another measurement basis may implement exemplary steering aspects described above (providing steered vectors). Other measurement bases may be selected by a user and used in other embodiments, for example, plural different measurement bases to implement different steering according to different viewpoints.

Processing circuitry 14 performs the processing in accordance with the respective measurement schemes 90, 90a using the respective measurement bases during processing 108, 108a which yields respective representations 116, 116a in the form of the normalized document vectors in the exemplary embodiment.

Processing circuitry 14 performs processing 138 including combining or blending the plural representations 116, 116a. In one embodiment, a user may select a blend constant weighting (a) which may be used to implement the desired blending and may be between 0 and 1. The user may instruct processing circuitry 14 to perform a plurality of processes 138 using different dynamically selected values of weighting (a). According to one aspect, the blending of different representations 116, 116a a plurality of times is straightforward and efficient inasmuch as the representations 116, 116a have already been calculated and may be reused in the respective different blending operations using the different weightings during respective processes 138.

In the described exemplary embodiment using representations 116, 116a comprising vectors, the processing circuitry 14 may multiple the individual scalar components of the respective vectors by the respective weighting of (a) or (1-a). In one embodiment, weighting provides respective weighted representations 140, 140a which may then be blended or combined to provide a composite representation 150 for the text item 100 which may also be referred to a knowledge representation or knowledge vector of the respective text item 100. In one embodiment, the processing circuitry 14 concatenates the weighted representations 140, 140a comprising vectors to provide the composite representation 150 in the form of a vector in one embodiment. The composite representation 150 comprises a mathematical representation of text unit 100 and may be used in subsequent processing with respect to the text item 100 including for example clustering, categorization, visualization and/or other processing. Plural composite representations 150 may be provided by the use of different weightings (a). The process of forming representations 116, 116a (without blending) and/or the composite representation 150 resulting from blending may be referred to as knowledge measurement of a text item 100 and are summations of the feature measurements for the measurement features (e.g., dimensions) it possesses.

In the described embodiment, the representations 116, 116a are normalized so the composite representation 150 is also normalized and no further normalization is used in one embodiment. Other blending methods are possible in other configurations. In addition, the exemplary blending operations are described with respect to representations generated according to the processing of FIGS. 2-3. Blending of FIG. 4 may be performed on other representations resulting from other processing of the text item 100 in other embodiments.

The illustrative aspects of the disclosure with respect to steering allows analysts to express particular domain viewpoints as sets of related terms and processing of text items may occur to give prominence to the analytic viewpoints. The viewpoint processing described according to illustrative embodiments allows a user to steer or bias the processing to perspective of interests (e.g., defined by text features or patterns selected by the user in one embodiment) and increase the likelihood that the results will capture the desired features or text patterns compared to processing where no steering is provided. In one embodiment, an analyst may formulate a plurality of viewpoints and processing circuitry 14 may use the viewpoints to generate a plurality of respective measurement bases configured to steer analysis of subsequent text to the respective perspective of interests of the viewpoints.

Furthermore, in one embodiment, steering during generation of representations allows representations to be blended with statistical knowledge measurement enabling an analyst to control degrees of expression of their viewpoint and, for example, combining benefits of rapidly recognizing anchoring concepts with discovery of unexpected relationships. In one illustrative embodiment, blending aspects permit an analyst to switch back and forth and with different degrees of weighting between the representations of unbiased contents of the data itself (statistically interesting vector) and biased or steered representations taking into account the perspective of interest of the user. Biasing or steering text analysis may mask unexpected results which may otherwise have been discovered by unbiased analysis. Blending permits an analyst to switch back and forth between different representations, perhaps iteratively, to analyze the contents of the text resulting from biased and unbiased processing in one example.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

Further, aspects herein have been presented for guidance in construction and/or operation of illustrative embodiments of the disclosure. Applicant(s) hereof consider these described illustrative embodiments to also include, disclose and describe further inventive aspects in addition to those explicitly disclosed. For example, the additional inventive aspects may include less, more and/or alternative features than those described in the illustrative embodiments. In more specific examples, Applicants consider the disclosure to include, disclose and describe methods which include less, more and/or alternative steps than those methods explicitly disclosed as well as apparatus which includes less, more and/or alternative structure than the explicitly disclosed structure.

What is claimed is:

1. A text analysis device comprising:
processing circuitry configured to analyze initial text to generate a measurement basis usable in analysis of subsequent text;
wherein the measurement basis comprises a plurality of measurement features from the initial text, a plurality of dimension anchors from the initial text and a plurality of associations of the measurement features with the dimension anchors;
wherein the processing circuitry is configured to access a viewpoint indicative of a perspective of interest of a user with respect to the analysis of the subsequent text, and wherein the processing circuitry is configured to use the viewpoint to generate the measurement basis; and
wherein the associations of the measurement basis comprise a plurality of association values indicative of probabilities that the dimension anchors are present in a plurality of text items of the subsequent text as a result of the identification of respective ones of the measurement features in the text items during the analysis of the subsequent text.

2. The device of claim 1 wherein the viewpoint comprises a plurality of text patterns, and the processing circuitry is configured to search for the presence of the text patterns during the analysis of the initial text to identify the measurement features and the dimension anchors.

3. The device of claim 2 wherein at least one of the measurement features comprises one of the text patterns.

4. The device of claim 2 wherein at least one of the dimension anchors is one of the text patterns.

5. The device of claim 2 wherein the viewpoint is configured to bias the analysis of the initial text by the processing circuitry to select one of the text patterns of the viewpoint as one of the measurement features compared with another text pattern not present in the viewpoint.

6. The device of claim 1 wherein the processing circuitry is configured to analyze the initial text comprising identifying a plurality of initial features occurring in the initial text, selecting some of the initial features as the measurement features and the dimension anchors, and generating the associations after the selecting.

7. The device of claim 6 wherein the viewpoint identifies at least one of the initial features.

8. The device of claim 7 wherein the processing circuitry is configured to:
score individual ones of the initial features; and
alter a score of one of the initial features responsive to the one initial feature being present within the viewpoint.

9. The device of claim 8 wherein the processing circuitry is configured to select the one initial feature as one of the measurement features using the score of the one initial feature.

10. The device of claim 6 wherein the viewpoint comprises a text pattern configured to bias the selection, by the processing circuitry, of at least one of the some initial features as one of the measurement features and which corresponds to the text pattern of the viewpoint.

11. The device of claim 1 wherein the processing circuitry is configured to alter respective ones of the association values which correspond to one of the measurement features responsive to the one of the measurement features corresponding to a text pattern of the viewpoint.

12. The device of claim 11 wherein the association values are in a matrix, and the processing circuitry is configured to alter selected ones of the association values of a row of the matrix corresponding to the one of the measurement features.

13. The device of claim 1 wherein the processing circuitry is configured to alter one of the association values of a first of the measurement features and a first of the dimension anchors responsive to the first measurement feature and the first dimension anchor corresponding to at least one text pattern of the viewpoint.

14. The device of claim 1 wherein the processing circuitry is configured to alter one of the association values of a first of the measurement features and a first of the dimension anchors responsive to a semantic similarity of the first measurement feature and the first dimension anchor.

15. The device of claim 1 wherein the perspective of interest comprises an initial perspective of interest and the measurement basis comprises an initial measurement basis configured to steer the analysis of the subsequent text with respect to the initial perspective of interest, and wherein the processing circuitry is configured to access another viewpoint indicative of another perspective of interest with respect to the analysis of the subsequent text, and wherein the processing circuitry is configured to generate another measurement basis using the another viewpoint and which is usable to steer the analysis of the subsequent text with respect to the another perspective of interest.

16. A text analysis device comprising:
processing circuitry configured to access a plurality of text items to be analyzed and to access a measurement basis comprising a plurality of relationships of text patterns and dimension anchors, and wherein the dimension anchors correspond to different topics of text content corresponding to a viewpoint indicative of a perspective of interest of a user;
wherein the processing circuitry is configured to analyze the text items using the measurement basis to associate the text items with respect to one another according to the perspective of interest; and
wherein the relationships of the measurement basis comprise a plurality of association values indicative of probabilities that the dimension anchors are present in the text items as a result of the identification of respective ones of the text patterns in the text items during the analysis of the text items.

17. The device of claim 16 wherein the viewpoint comprises a plurality of text patterns corresponding to the perspective of interest.

18. An article of manufacture comprising:
non-transitory media storing programming configured to cause processing circuitry to perform processing comprising:
identifying a plurality of initial features of initial text;

analyzing the initial features to identify a plurality of measurement features and a plurality of dimension anchors;

using the identified measurement features and dimension anchors, generating a measurement basis configured to be used in analysis of subsequent text;

accessing a viewpoint indicative of a perspective of interest with respect to the analysis of the subsequent text;

utilizing the viewpoint to perform the generation of the measurement basis; and wherein the measurement basis comprises a plurality of association values indicative of probabilities that the dimension anchors are present in a plurality of text items of the subsequent text as a result of the identification of respective ones of the measurement features in the text items during the analysis of the subsequent text.

19. A text analysis method comprising:

accessing initial text;

accessing a viewpoint indicative of a perspective of interest of a user with respect to analysis of subsequent text;

steering analysis of the initial text using the viewpoint to provide a measurement basis configured to be used in the analysis of the subsequent text with respect to the perspective of interest, wherein the measurement basis comprises a plurality of associations of a plurality of text patterns with a plurality of dimension anchors in accordance with the perspective of interest of the viewpoint, and wherein the associations of the measurement basis comprise a plurality of association values indicative of probabilities that the dimension anchors are present in a plurality of text items of the subsequent text as a result of the identification of respective ones of the text patterns in the text items during the analysis of the subsequent text.

20. The method of claim 19 wherein the steering comprises adjusting at least one of the association values corresponding to one of the text patterns and wherein the one of the text patterns is defined in the viewpoint.

21. The method of claim 19 wherein the viewpoint includes at least one text pattern, and wherein the steering comprises biasing selection of the at least one text pattern as one of the dimension anchors of the measurement basis.

22. A text analysis device comprising:

processing circuitry configured to analyze initial text to generate a measurement basis usable in analysis of subsequent text;

wherein the measurement basis comprises a plurality of measurement features from the initial text, a plurality of dimension anchors from the initial text and a plurality of associations of the measurement features with the dimension anchors;

wherein the processing circuitry is configured to access a viewpoint which comprises one or more text patterns defined at least in part by a user and which are indicative of a perspective of interest of the user with respect to the analysis of the subsequent text, and wherein the processing circuitry is configured to use the viewpoint to generate the measurement basis;

wherein the processing circuitry is configured to search for the presence of the one or more text patterns during the analysis of the initial text to identify the measurement features and the dimension anchors; and wherein the associations of the measurement basis comprise a plurality of association values indicative of probabilities that the dimension anchors are present in a plurality of text items of the subsequent text as a result of the identification of respective ones of the measurement features in the text items during the analysis of the subsequent text.

23. The device of claim 16 wherein the text items to be analyzed comprise subsequent text, and the processing circuitry is configured to access the viewpoint which comprises one or more text patterns defined at least in part by the user and to search for the presence of the one or more text patterns during analysis of initial text to identify the dimension anchors of the measurement basis.

24. The device of claim 18 wherein the accessing the viewpoint comprises accessing one or more text patterns defined at least in part by a user and the identifying and the analyzing comprise searching the initial text for the presence of the one or more text patterns to identify the measurement features and the dimension anchors.

25. The device of claim 18 wherein the analyzing comprises analyzing to identify the measurement features and the dimension anchors individually comprising a selected one of the initial features.

26. The device of claim 18 wherein the accessing the viewpoint comprises accessing a plurality of text patterns which are indicative of the perspective of interest from a user.

27. The device of claim 19 wherein the accessing the viewpoint comprises accessing one or more text patterns which are defined at least in part by the user and the steering comprises searching the initial text for the presence of the one or more text patterns defined by the user to identify the text patterns and the dimension anchors of the measurement basis.

28. The device of claim 6 further comprising generating merit scores for respective ones of the initial features, and the selecting the initial features as measurement features comprises selecting using the merit scores, and the selecting the initial features as the dimension anchors comprises selecting the measurement features having the highest merit scores.

29. The device of claim 1 wherein the measurement basis comprises a matrix which includes the association values.

30. The device of claim 16 wherein the measurement basis comprises a matrix which includes the association values.

31. The method of claim 19 wherein the measurement basis comprises a matrix which includes the association values.

32. The device of claim 22 wherein the measurement basis comprises a matrix which includes the association values.

* * * * *

UNITED STATES PATENT AND TRADEMARK OFFICE
CERTIFICATE OF CORRECTION

PATENT NO. : 8,452,767 B2
APPLICATION NO. : 11/522178
DATED : May 28, 2013
INVENTOR(S) : Alan E. Turner, Elizabeth G. Hetzler and Grant C. Nakamura It is certified that error appears in the above-identified patent and that said Letters Patent is hereby corrected as shown below:

In the Specifications

Column 5, line 7 – Replace "analysis the" with --analysis of the--

Column 12, line 1 – Replace "may multiple the" with --may multiply the--

Signed and Sealed this
Thirtieth Day of July, 2013

Teresa Stanek Rea
*Acting Director of the United States Patent and Trademark Office*